United States Patent
Mukherjee

(10) Patent No.: US 11,763,585 B2
(45) Date of Patent: Sep. 19, 2023

(54) MULTI-LAYER NEURAL NETWORK AND CONVOLUTIONAL NEURAL NETWORK FOR CONTEXT SENSITIVE OPTICAL CHARACTER RECOGNITION

(71) Applicant: Bank of America Corporation, Charlotte, NC (US)

(72) Inventor: Maharaj Mukherjee, Poughkeepsie, NY (US)

(73) Assignee: Bank of America Corporation, Charlotte, NC (US)

( * ) Notice: Subject to any disclaimer, the term of this patent is extended or adjusted under 35 U.S.C. 154(b) by 266 days.

(21) Appl. No.: 17/375,319

(22) Filed: Jul. 14, 2021

(65) Prior Publication Data

US 2023/0019919 A1 Jan. 19, 2023

(51) Int. Cl.
| | | |
|---|---|---|
| *G06V 30/40* | (2022.01) | |
| *G06N 3/08* | (2023.01) | |
| *G06F 18/214* | (2023.01) | |
| *G06N 3/044* | (2023.01) | |
| *G06N 3/045* | (2023.01) | |
| *G06V 30/10* | (2022.01) | |

(52) U.S. Cl.
CPC ............ *G06V 30/40* (2022.01); *G06F 18/214* (2023.01); *G06N 3/044* (2023.01); *G06N 3/045* (2023.01); *G06N 3/08* (2013.01); *G06V 30/10* (2022.01)

(58) Field of Classification Search
CPC .......... G06N 3/044; G06N 3/045; G06N 3/08; G06V 30/10; G06V 30/40; G06V 10/82; G06F 18/214
See application file for complete search history.

(56) References Cited

U.S. PATENT DOCUMENTS

| | | |
|---|---|---|
| 9,263,036 B1 | 2/2016 | Graves |
| 10,127,901 B2 | 11/2018 | Zhao et al. |
| 10,199,038 B1 | 2/2019 | Graves |
| 10,333,714 B2 | 6/2019 | Noh et al. |
| 10,453,446 B1 | 10/2019 | Graves |
| 10,621,237 B1* | 4/2020 | Rathnavelu ........... G06F 16/332 |
| 10,716,169 B2 | 7/2020 | Vesely et al. |

(Continued)

OTHER PUBLICATIONS

Li, et al. (Reading car license plates using deep neural networks), pp. 14-23 (Year: 2018).*

*Primary Examiner* — Daniel G Mariam
(74) *Attorney, Agent, or Firm* — Banner & Witcoff, Ltd.

(57) ABSTRACT

Aspects of the disclosure relate to OCR. A computing platform may train, using historical images, a CNN and a RNN to perform OCR/identify characters in context. The computing platform may receive an image of a document, and may input the image into the CNN, which may cause the CNN to output OCR information for the image and a confidence score. Based on identifying that the confidence score exceeds a confidence threshold, the computing platform may store the OCR information to enable subsequent access of a digital version of the document. Based on identifying that the confidence score does not exceed the confidence threshold, the computing platform may: 1) input the OCR information into the first RNN, which may cause the first RNN to output contextual OCR information for the image, and 2) store the contextual OCR information to enable subsequent access of the digital version of the document.

20 Claims, 11 Drawing Sheets

(56) References Cited

U.S. PATENT DOCUMENTS

| | | |
|---|---|---|
| 10,770,064 B1 | 9/2020 | Graves |
| 10,923,109 B2 | 2/2021 | Chakraborty et al. |
| 10,936,862 B2 | 3/2021 | Such et al. |
| 10,936,863 B2 | 3/2021 | Simantov et al. |
| 10,936,897 B2 | 3/2021 | Vig et al. |
| 10,943,176 B2 | 3/2021 | Yu et al. |
| 10,943,274 B2 | 3/2021 | Ghatage et al. |
| 10,963,721 B2 | 3/2021 | Georgis |
| 10,970,535 B2 | 4/2021 | Mallick et al. |
| 10,970,768 B2 | 4/2021 | Zheng et al. |
| 11,003,862 B2 | 5/2021 | Aggarwal et al. |
| 11,017,294 B2 | 5/2021 | Na |
| 11,023,766 B2 | 6/2021 | Li |
| 11,023,767 B2 | 6/2021 | Sarshogh et al. |
| 11,037,010 B2 | 6/2021 | Corring et al. |
| 2021/0201266 A1* | 7/2021 | Wang .................... G06Q 10/10 |

\* cited by examiner

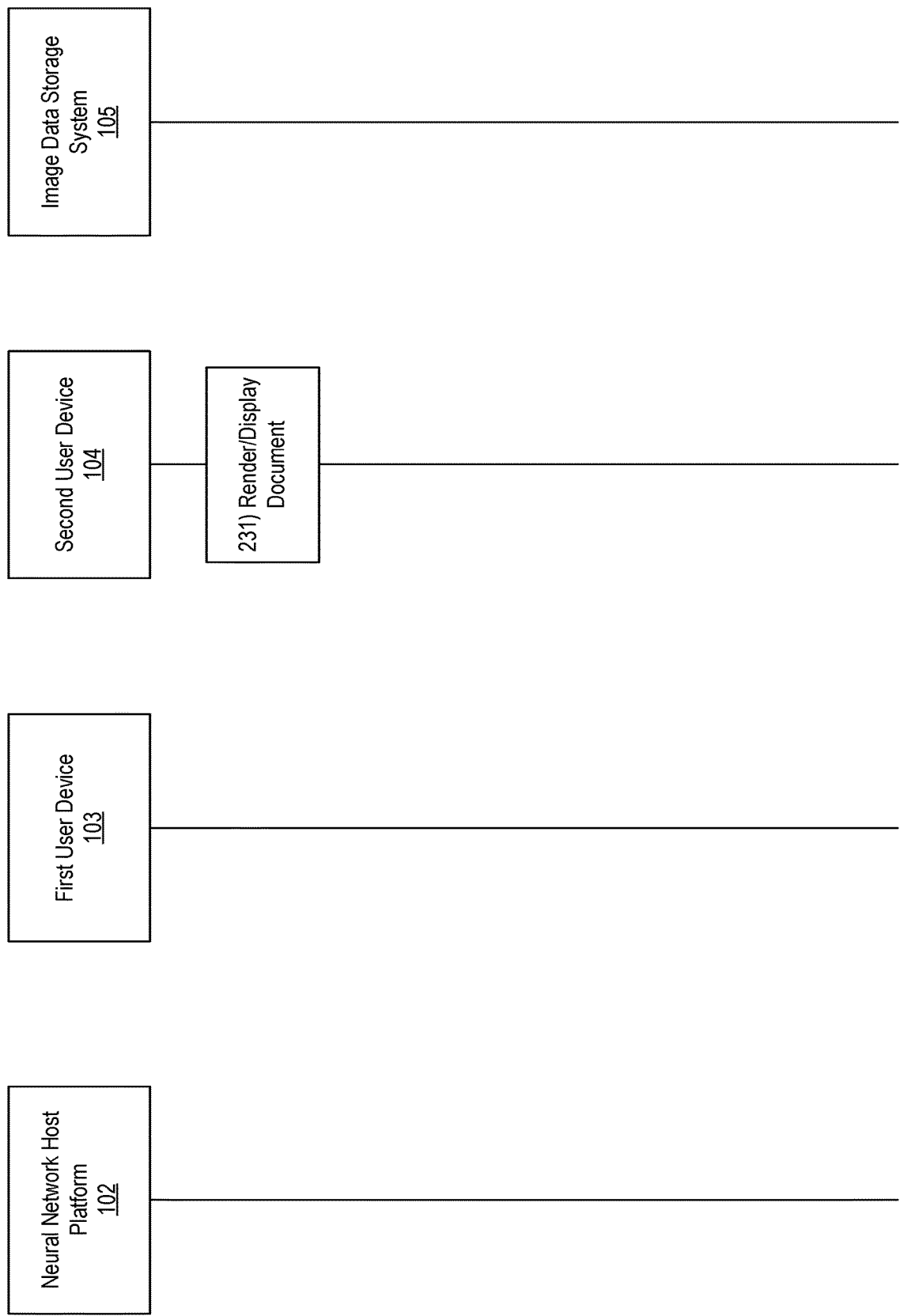

405 — OCR Input Request

Please input the 3rd word in sentence one of the 3rd page below:

FIG. 4

505 — Mortgage Document

Your mortgage (as shown below) has been electronically generated using optical character recognition and neural networks to maximize accuracy...

FIG. 5

MULTI-LAYER NEURAL NETWORK AND CONVOLUTIONAL NEURAL NETWORK FOR CONTEXT SENSITIVE OPTICAL CHARACTER RECOGNITION

BACKGROUND

Aspects of the disclosure relate to optical character recognition. In some cases, convolutional neural networks (CNN) may be used to perform optical character recognition (OCR). In some instances, however, the CNN may identify multiple character candidates, and may be unable to distinguish which is correct. This may result in inaccuracies in OCR, which may affect downstream natural language processing (NLP) and/or document processing, which may be based on the OCR results.

SUMMARY

Aspects of the disclosure provide effective, efficient, scalable, and convenient technical solutions that address and overcome the technical problems associated with optical character recognition. In accordance with one or more embodiments of the disclosure, a computing platform comprising at least one processor, a communication interface, and memory storing computer-readable instructions may train, using historical images and historical image information, a CNN and a first recursive neural network (RNN), which may configure: 1) the CNN to perform OCR, and 2) the first RNN to identify one or more characters using a first context on which the first RNN is trained. The computing platform may receive an image of a document. The computing platform may input the image into the CNN, which may cause the CNN to output OCR information for the image and a first confidence score indicating an accuracy level corresponding to the OCR information. The computing platform may compare the first confidence score to a confidence threshold. Based on identifying that the first confidence score exceeds the confidence threshold, the computing platform may store the OCR information along with the image to enable subsequent access of a digital version of the document. Based on identifying that the first confidence score does not exceed the confidence threshold, the computing platform may: 1) input the OCR information into the first RNN, which may cause the first RNN to output contextual OCR information for the image, and 2) store the contextual OCR information along with the image to enable subsequent access of the digital version of the document.

In one or more instances, the first context on which the first RNN is trained may be a word context, and training the first RNN may include training the first RNN to identify the one or more characters based on words in which the one or more characters are located. In one or more instances, the computing platform may output, using the first RNN, a second confidence score indicating an accuracy level corresponding to the contextual OCR information. The computing platform may compare the second confidence score to the confidence threshold. Based on identifying that the second confidence score exceeds the confidence threshold, the computing platform may store the contextual OCR information along with the image to enable subsequent access of a digital version of the document. Based on identifying that the second confidence score does not exceed the confidence threshold, the computing platform may: 1) input the contextual OCR information into a second RNN, which may cause the second RNN to update the contextual OCR information based on a second context, and 2) store the updated contextual OCR information along with the image to enable subsequent access of a digital version of the document.

In one or more examples, the computing platform may train, using the historical images and the historical image information, the second RNN, which may configure the second RNN to identify the one or more characters using the second context, where the second context is broader than the first context. In one or more examples, the second context on which the second RNN is trained may be a sentence context, and training the second RNN may include training the second RNN to identify the one or more characters based on sentences in which the one or more characters are located.

In one or more instances, the computing platform may output, using the second RNN, a third confidence score indicating an accuracy level corresponding to the updated contextual OCR information. The computing platform may compare the third confidence score to the confidence threshold. Based on identifying that the third confidence score exceeds the confidence threshold, the computing platform may store the updated contextual OCR information along with the image to enable subsequent access of a digital version of the document. Based on identifying that the third confidence score does not exceed the confidence threshold, the computing platform may: 1) input the updated contextual OCR information into a third RNN, which may cause the third RNN to further update the updated contextual OCR information based on a third context, and 2) store the further updated contextual OCR information along with the image to enable subsequent access of a digital version of the document.

In one or more examples, the computing platform may train, using the historical images and the historical image information, the third RNN, which may configure the third RNN to identify the one or more characters using the third context, where the third context is broader than the second context. In one or more examples, the third context on which the third RNN is trained may be a document type context, and training the third RNN may include training the third RNN to identify the one or more characters based on types of documents in which the one or more characters are located.

In one or more instances, the computing platform may output, using the third RNN, a fourth confidence score indicating an accuracy level corresponding to the further updated contextual OCR information. The computing platform may compare the fourth confidence score to the confidence threshold. Based on identifying that the fourth confidence score exceeds the confidence threshold, the computing platform may store the further updated contextual OCR information along with the image to enable subsequent access of a digital version of the document. Based on identifying that the fourth confidence score does not exceed the confidence threshold, the computing platform may: 1) send one or more commands directing a user device to provide a manual OCR input identifying the one or more characters, which may cause the user device to display a user interface prompting for manual input of the one or more characters, 2) receive the manual OCR input, and 3) store the manual OCR input along with the image to enable subsequent access of a digital version of the document.

In one or more examples, the computing platform may receive a request to access the digital version of the document. The computing platform may retrieve, from storage, the contextual OCR information and the image. The computing platform may send, to a user device, one or more commands directing the user device to display the digital version of the document based on the contextual OCR information and the image, which may cause the user device to display the digital version of the document.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2G depict an illustrative event sequence for implementing a multi-layer RNN and CNN for context sensitive OCR in accordance with one or more example embodiments;

FIGS. 4 and 5 depict illustrative graphical user interfaces for implementing a multi-layer RNN and CNN for context sensitive OCR in accordance with one or more example embodiments.

DETAILED DESCRIPTION

Figure 1A:
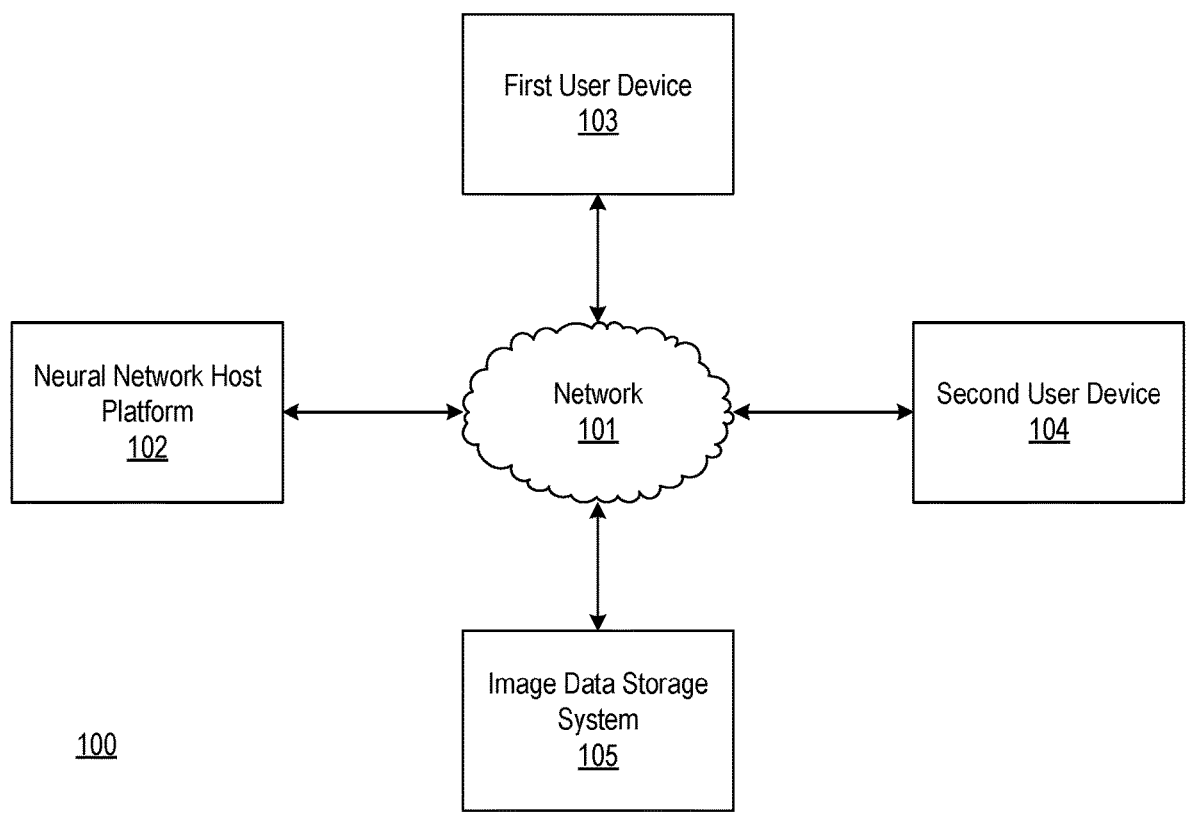
FIGS. 1A-1B depict an illustrative computing environment for implementing a multi-layer RNN and CNN for context sensitive OCR in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to using CNN and RNN layers to improve OCR. OCR may be performed using several artificial intelligence (AI), machine learning (ML), and/or pattern recognition solutions such as document processing and natural language processing (NLP). OCR is the electronic or mechanical conversion of images of typed, handwritten, or printed text into machine-encoded text, whether from a scanned document, a photo or other image of a document, a scene-photo (e.g., the text on signs and billboards in a landscape photo) or from subtitle text superimposed on an image (for example: from a television broadcast). Widely used as a form of data entry from printed paper data records (e.g., passport documents, invoices, bank statements, computerized receipts, business cards, mail, printouts of static-data, and/or other types of suitable documentation)—OCR is a common method of digitizing printed texts so that they may be electronically edited, searched, stored more compactly, displayed on-line, and/or used in machine processes such as cognitive computing, machine translation, (extracted) text-to-speech, key data and text mining. OCR is a field of research in pattern recognition, artificial intelligence, and computer vision.

However, OCR still has not achieved 100% accuracy. Some characters such as "e" and "c," or "0" and "o", or "I" and "1" are easily confused. Since downstream applications such as NLP and document processing applications may depend on a very accurate OCR, they may be impacted if the underlying OCR technology is error prone.

Accordingly, described herein is a solution that performs context sensitive OCR using multiple layers of RNN and one layer of CNN. The multiple layers of RNN may be used to determine context, whereas a single layer of CNN may be used for image/character recognition.

For example, "e" and "c" may be confused by OCR. However, if the usage of "e" and "c" is considered within the context of its usage within a word, these letters may be distinguished. For example, looking at the word "tea," it may be determined by knowing that the letter is used between "t" and "a" that it is an "e" and not "c," because "tea" is a valid word in the English dictionary whereas "tca" is not. On the other hand, just by the context at the word level, it may not be so easily determined. For example, both "eat" and "cat" are valid words in the English language. Accordingly, to distinguish between "e" and "c" in this context, another layer of context may be needed, such as how the word is used within a sentence along with other words. For example, a sentence like "eat a cake" is correct, whereas "cat a cake" does not make sense. Accordingly, if the context is known at both the sentence and word levels, the correct letter may be determined. Sometimes, even further context may be needed. For example, bad imaging may cause a "p" to appear as "e," and a determination may be needed on whether a particular sentence recites "pat a cake" or "eat a cake." In these instances, a paragraph or chapter may be used as context to interpret the sentence (as both are valid sentences).

As described herein, a first layer of the described system may be a CNN, which may be used to implement OCR. Traditional CNN classifiers may be capable of learning the important 2D features present in images such as English character images and classifying them. A CNN may use the convolution of the image using a fast Fourier transformation (FFT) and may recognize images in a 2-D spatial-frequency domain.

The next set of layers may be a series of RNNs that may be used to identify context. RNNs are feedback networks that may learn from orders of items. However, even with the help of long short-term memory (LSTM), they may have difficulty keep a long term memory. Therefore, multiple RNN layers may be needed. The first layer of RNN may use context of words and the second layer may determine the context of sentences. Additional layers of RNN may be incorporated, which may broaden the context at each level.

As a result, described herein are techniques for using paragraphs, sentences, and/or word contexts for OCR. Multiple levels of RNN are used to identify contexts at different levels of text such as words, sentences, paragraphs, or other contexts, and these may be combined with CNN to create a hybrid model for OCR.

These and other features are described in further detail below.

Figure 1B:
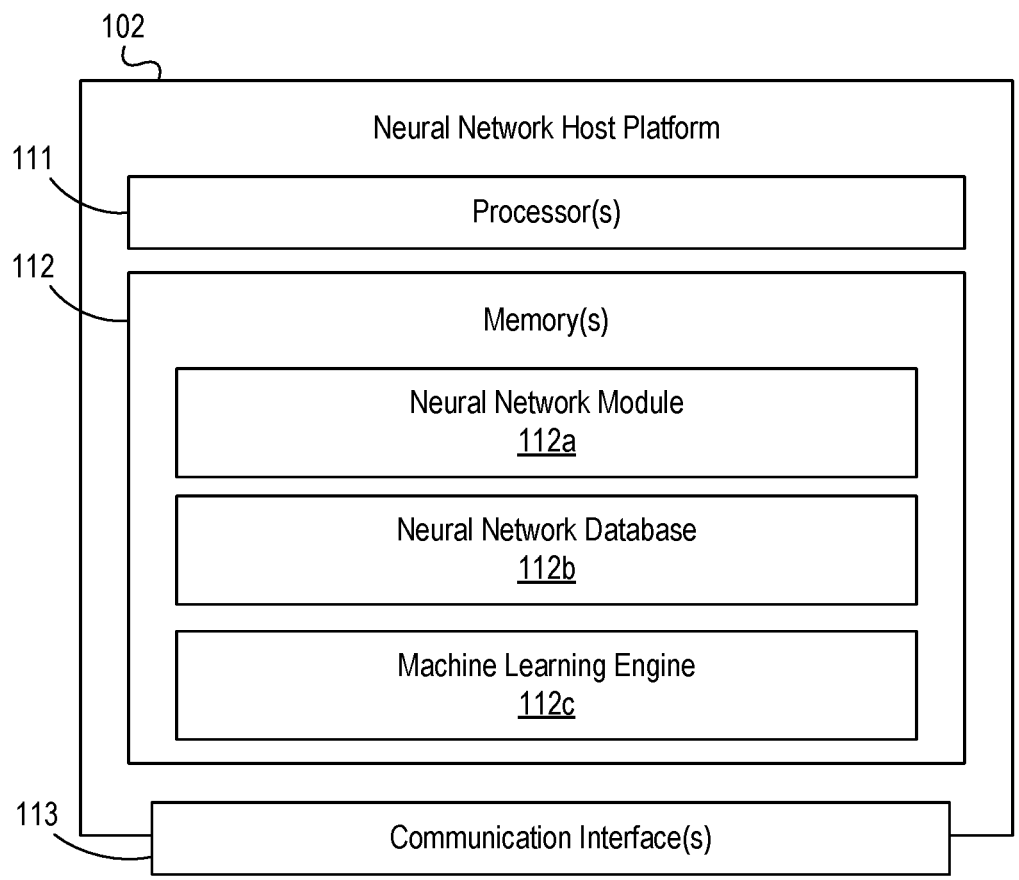

FIGS. 1A-1B depict an illustrative computing environment that implements a multi-layer RNN and CNN for context sensitive OCR in accordance with one or more example embodiments. Referring to FIG. 1A, computing environment 100 may include one or more computer systems. For example, computing environment 100 may include a neural network host platform 102, a first user device 103, a second user device 104, and an image data storage system 105.

As described further below, neural network host platform 102 may be a computer system that includes one or more computing devices (e.g., servers, server blades, or the like) and/or other computer components (e.g., processors, memories, communication interfaces) that may be used to train, host, and/or otherwise maintain a CNN and one or more RNN layers, which may subsequently be used to perform context sensitive OCR.

First user device 103 may be a laptop computer, desktop computer, mobile device, tablet, smartphone, scanner, and/or other device that may be used by an individual to upload, scan, capture, and/or otherwise provide an image for OCR. In some instances, first user device 103 may be configured to display one or more user interfaces (e.g., interfaces prompting for a manual OCR input, or the like).

Second user device 104 may be a laptop computer, desktop computer, mobile device, tablet, smartphone, and/or other device that may be used by an individual to access a digital version of a document generated using OCR (e.g., from an image provided by the first user device 103). In some instances, second user device 104 may be configured to display one or more user interfaces (e.g., interfaces that include the digital document version).

Image data storage system 105 may be or include one or more computing devices (servers, server blades, or the like) that may be configured to store historical image data (which may e.g., be images of documents or other papers) and historical image information (which may e.g., be OCR information/results corresponding to those documents). For example, the image data storage system 105 may store historical image data/information related to one or more of: scanned documents, document photos, scene-photos, subtitle text superimposed on images, or the like of various documents such as passport documents, invoices, bank statements, mortgages documents, computerized receipts, business cards, mail, printouts of static-data, and/or other documents.

Computing environment 100 also may include one or more networks, which may interconnect neural network host platform 102, first user device 103, second user device 104, and/or image data storage system 105. For example, computing environment 100 may include a network 101 (which may interconnect, e.g., neural network host platform 102, first user device 103, second user device 104, and/or image data storage system 105).

In one or more arrangements, neural network host platform 102, first user device 103, second user device 104, and/or image data storage system 105 may be any type of computing device capable of sending and/or receiving requests and processing the requests accordingly. For example, neural network host platform 102, first user device 103, second user device 104, image data storage system 105 and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of neural network host platform 102, first user device 103, second user device 104, and/or image data storage system 105 may, in some instances, be special-purpose computing devices configured to perform specific functions.

Referring to FIG. 1B, neural network host platform 102 may include one or more processors 111, memory 112, and communication interface 113. A data bus may interconnect processor 111, memory 112, and communication interface 113. Communication interface 113 may be a network interface configured to support communication between neural network host platform 102 and one or more networks (e.g., network 101, or the like). Memory 112 may include one or more program modules having instructions that when executed by processor 111 cause neural network host platform 102 to perform one or more functions described herein and/or one or more databases that may store and/or otherwise maintain information which may be used by such program modules and/or processor 111. In some instances, the one or more program modules and/or databases may be stored by and/or maintained in different memory units of neural network host platform 102 and/or by different computing devices that may form and/or otherwise make up neural network host platform 102. For example, memory 112 may have, host, store, and/or include neural network module 112a, neural network database 112b, and/or machine learning engine 112c.

Neural network module 112a may have instructions that direct and/or cause neural network host platform 102 to perform context sensitive OCR, as discussed in greater detail below. Neural network database 112b may store information used by neural network module 112a and/or neural network host platform 102 in application of advanced techniques to perform context sensitive OCR, and/or in performing other functions. Machine learning engine 112c may be used by neural network host platform 102 and/or neural network module 112a to refine and/or otherwise update methods for context sensitive OCR, and/or other methods described herein.

Figure 2A:
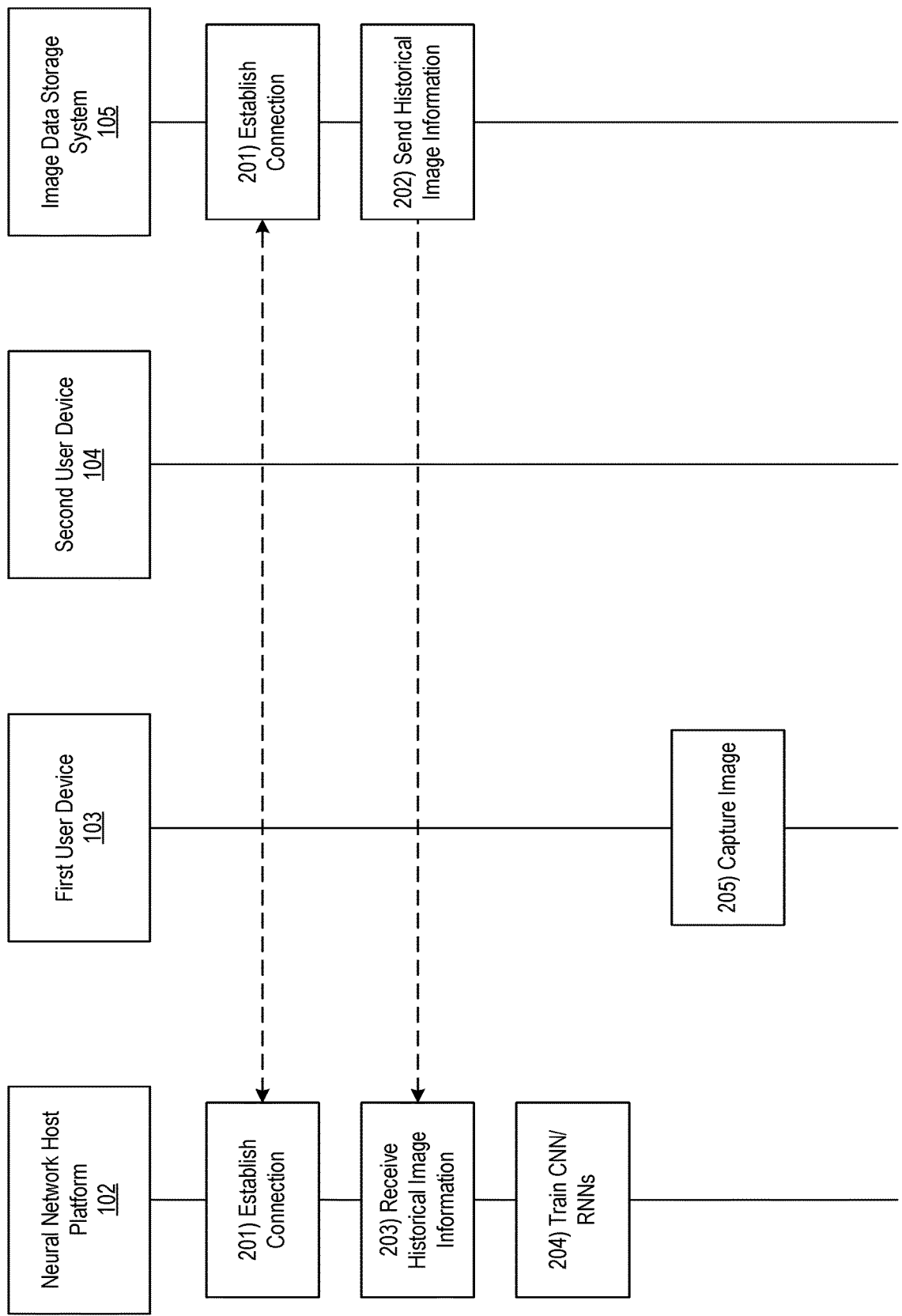

FIGS. 2A-2F depict an illustrative event sequence for implementing a multi-layer RNN and CNN for context sensitive OCR in accordance with one or more example embodiments. Referring to FIG. 2A, at step 201, image data storage system 105 may establish a connection with the neural network host platform 102. For example, the image data storage system 105 may establish a first wireless data connection with the neural network host platform 102 to link the image data storage system 105 to the neural network host platform 102 (e.g., in preparation for sending historical images and/or historical image information). In some instances, the image data storage system 105 may identify whether a connection is already established with the neural network host platform 102. If a connection is already established, the image data storage system 105 might not re-establish the connection. If a connection is not yet established, the image data storage system 105 may establish the first wireless data connection as described herein.

At step 202, the image data storage system 105 may send historical images and/or historical image information to the neural network host platform 102. For example, the image data storage system 105 may send the historical images and/or historical image information to the neural network host platform 102 while the first wireless data connection is established. In some instances, the image data storage system 105 may send historical image data/information related to one or more of: scanned documents, document photos, scene-photos, subtitle text superimposed on images, or the like of various documents such as passport documents, invoices, bank statements, mortgages documents, computerized receipts, business cards, mail, printouts of static-data, and/or other documents.

At step 203, the neural network host platform 102 may receive the historical images and/or historical image information sent at step 202. For example, the neural network host platform 102 may receive the historical images and/or historical image information via the communication interface 113 and while the first wireless data connection is established.

At step 204, the neural network host platform 102 may use the historical images and/or historical image information to train a CNN and one or more RNNs. For example, in training the CNN, the neural network host platform 102 may use one or more supervised learning techniques to train a model for OCR. In some instances, to do so, the neural network host platform 102 may store a plurality of images corresponding to various characters (e.g., letters, numbers, symbols, or the like) and may label them based on the corresponding characters. This may establish a database of known images corresponding to each character, which may then be used for comparison purposes in OCR.

In training the one or more RNNs, the neural network host platform 102 may train a plurality of models to recognize characters based on various contexts. In some instances, to do so, the neural network host platform 102 may use the historical images, historical image information, and/or other information (e.g., dictionaries, or the like). For example, the neural network host platform 102 may establish a dataset of known words in the English language, and may store this within a first RNN. Accordingly, the neural network host platform 102 may be able to use these known words for comparison purposes to identify a word context for future inputs (e.g., is a particular word valid or not when given the proposed identity). In a similar manner, the neural network host platform 102 may train additional RNNs to identify a correct character by inputting training data labelled as "valid" or "not valid" based on a context for the given RNN (e.g., is a particular character valid given a sentence context, paragraph context, chapter context, document type context, and/or other contexts). This may train the various RNNs, in their various contexts, to identify a correct character by identifying that it is valid within the particular context whereas another possible character is not valid. At step 205, the first user device 103 may capture an image, a scan, or the like that includes a document for which a digital version should be produced using OCR.

Figure 2B:
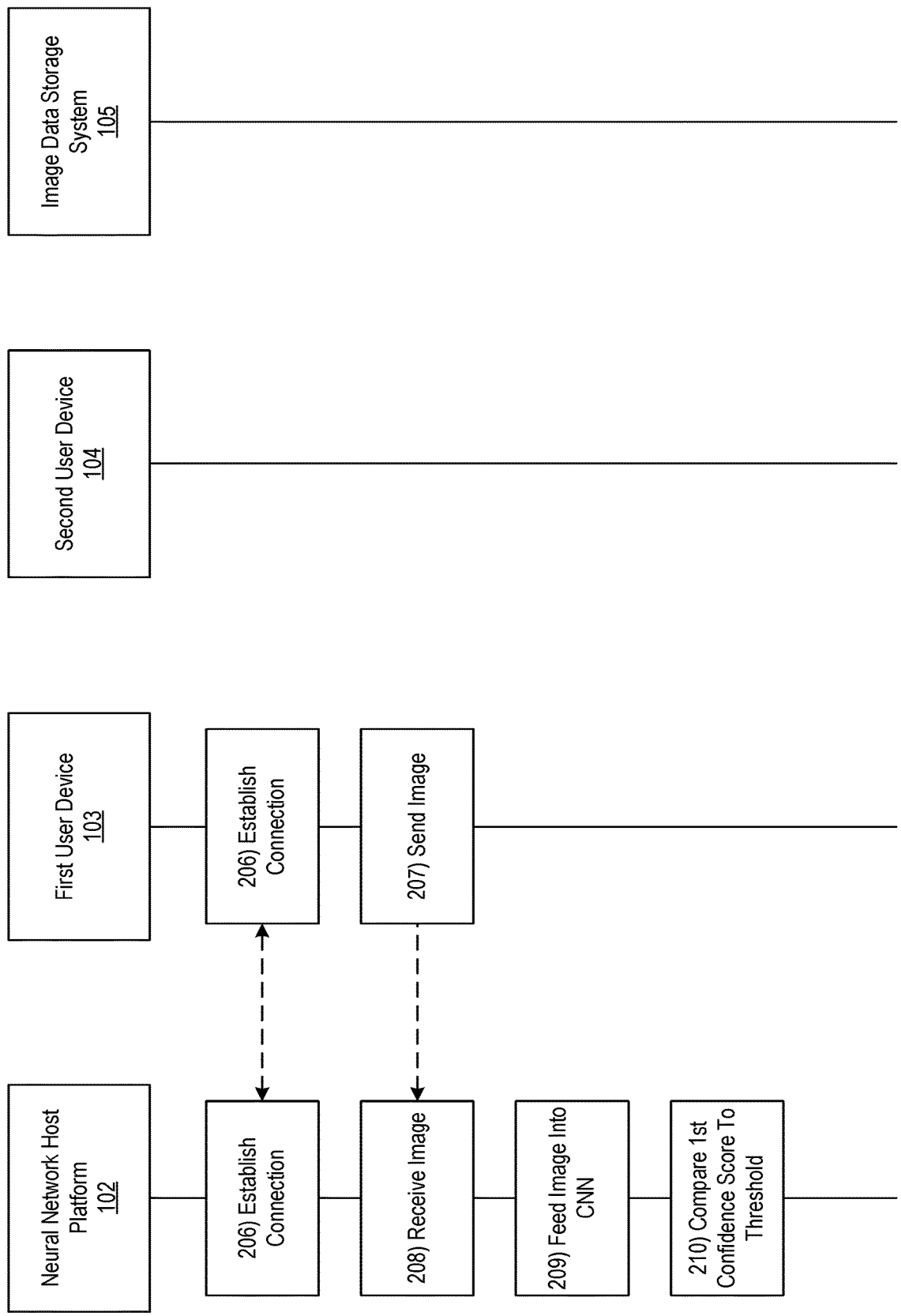

Referring to FIG. 2B, at step 206, the first user device 103 may establish a connection with the neural network host platform 102. For example, the first user device 103 may establish a second wireless data connection with the neural network host platform 102 to link the first user device 103 to the neural network host platform 102 (e.g., in preparation for sending the image received at step 205). In some instances, the first user device 103 may identify whether a connection is already established with the neural network host platform 102. If a connection is already established with the neural network host platform 102, the first user device 103 might not re-establish the connection. If a connection is not yet established with the neural network host platform 102, the first user device 103 may establish the second wireless data connection as described herein.

At step 207, first user device 103 may send the image, collected at step 205, to the neural network host platform 102. For example, the first user device 103 may send the image while the second wireless data connection is established.

At step 208, the neural network host platform 102 may receive the image sent at step 207. For example, the neural network host platform 102 may receive the image via the communication interface 113 and while the second wireless data connection is established.

At step 209, the neural network host platform 102 may feed the image into the CNN. In doing so, the neural network host platform 102 may use the CNN to perform OCR on the image, resulting in OCR information. In some instances, the neural network host platform 102 may also output a first confidence score using the CNN, which may indicate a level of confidence that the OCR information is accurate.

At step 210, the neural network host platform 102 may compare the first confidence score to a confidence threshold. If the neural network host platform 102 identifies that the first confidence score meets or exceeds the confidence threshold, the neural network host platform 102 may proceed to step 223. Otherwise, if the neural network host platform 102 identifies that the first confidence score does not exceed the confidence threshold, the neural network host platform 102 may proceed to step 211.

Figure 2C:
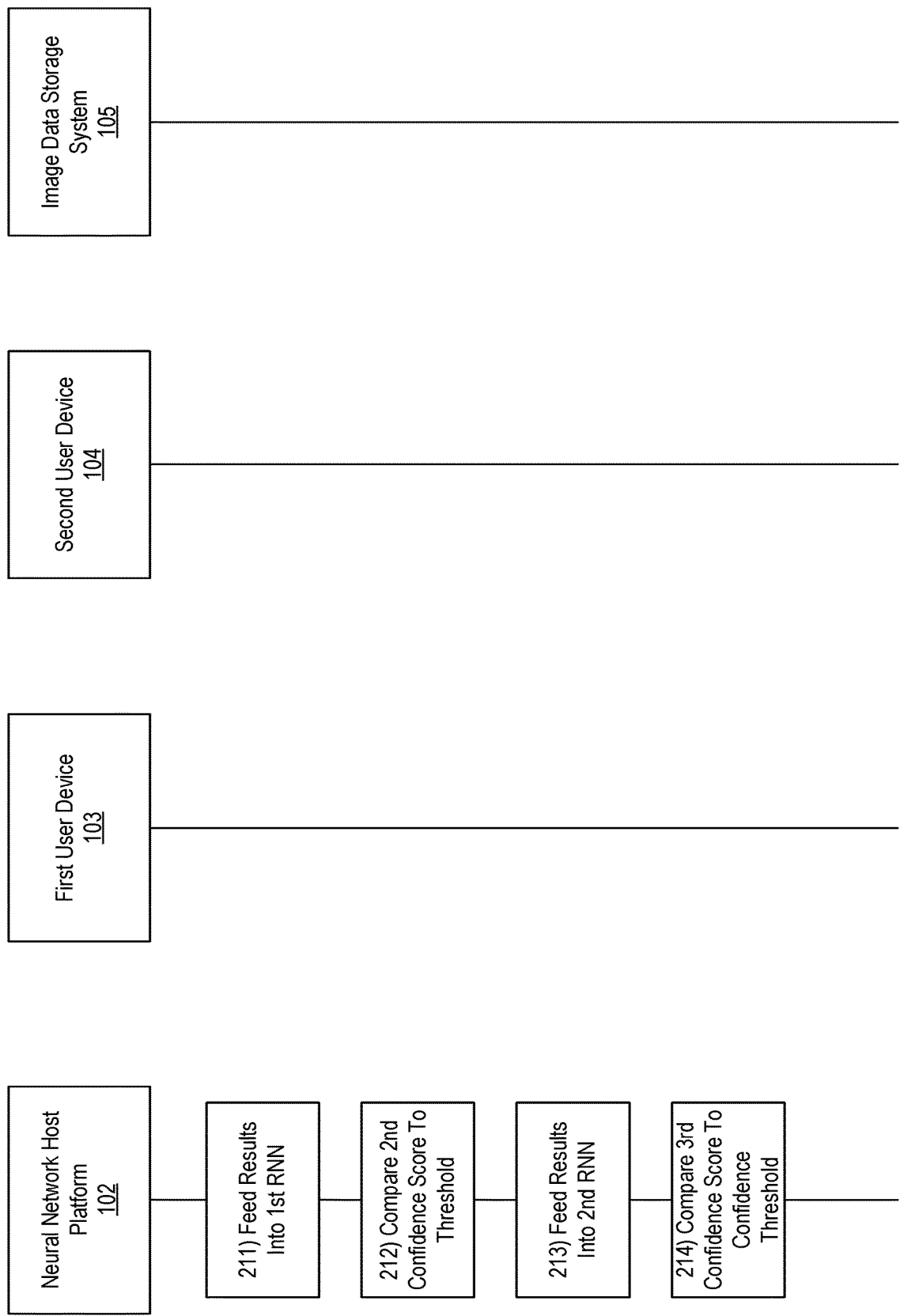

Referring to FIG. 2C, at step 211, the neural network host platform 102 may feed the results of the CNN into a first RNN, which may be trained on a first context. For example, the neural network host platform 102 may feed the results of the CNN into a first RNN trained to identify a character based on a word context. As a result, the neural network host platform 102 may output contextual OCR information and a second confidence score, indicating a level of accuracy associated with the contextual OCR information.

As a particular example, the CNN may have output that a particular character was either "e" or "c," but was only 50% confident that the character was either one. Accordingly, the neural network host platform 102 may use the first RNN to use a word that the character is in to help identify whether the character is "e" or "c." In some instances, the first RNN may be able to identify the character with a confidence level that meets or exceeds the confidence threshold. For example, the first RNN may identify that the character is used between a "t" and an "a," and may assess the words "tea" and "tca" for validity. As a result, because "tea" is valid whereas "tca" is not, the first RNN may identify that the character is "e" with a confidence score that exceeds the confidence threshold. In contrast, if multiple results from the first RNN are valid, the first RNN may produce a confidence score that does not exceed the confidence threshold. For example, the first RNN may identify that the character is used before "at," and thus may produce either the word "eat" or "cat," both of which are valid, and thus further analysis should be performed.

At step 212, the neural network host platform 102 may compare the second confidence score to the confidence threshold. If the neural network host platform 102 identifies that the second confidence score meets or exceeds the confidence threshold, the neural network host platform 102 may proceed to step 223. If the neural network host platform 102 identifies that the second confidence score does not exceed the confidence threshold, the neural network host platform 102 may proceed to step 213.

At step 213, the neural network host platform 102 may feed the results of the first RNN into a second RNN, which may be trained on a second context, different (and/or broader) than the first context. For example, the neural network host platform 102 may feed the results of the first RNN into a second RNN trained to identify a character based on a sentence context. As a result, the neural network host platform 102 may output updated contextual OCR information and a third confidence score, indicating a level of accuracy associated with the updated contextual OCR information.

To continue with the example described above, the first RNN may have output that a particular character was either "e" or "c," but was only 50% confident that the character was either one. For example, both characters may have resulted in valid words (e.g., "eat" and "cat"). Accordingly, the neural network host platform 102 may use the second RNN to identify whether the character is "e" or "c," based on a whether the corresponding words make sense in the context of the given sentence. In some instances, the second RNN may be able to identify the character with a confidence level that meets or exceeds the confidence threshold. For example, the second RNN may identify that the word is used before "a cake." As a result, because "eat a cake" is a valid sentence/phrase whereas "cat a cake" is not, the second RNN may identify that the character is "e" with a confidence score that meets or exceeds the confidence threshold. In contrast, if multiple results from the second RNN are valid (e.g., both words make sense in context of the sentence), the second RNN may produce a confidence score that does not exceed the confidence threshold.

At step 214, the neural network host platform 102 may compare the third confidence score to the confidence threshold. If the neural network host platform 102 identifies that the third confidence score meets or exceeds the confidence threshold, the neural network host platform 102 may proceed to step 223. If the neural network host platform 102 identifies that the third confidence score does not exceed the confidence threshold, the neural network host platform 102 may proceed to step 215.

Figure 2D:
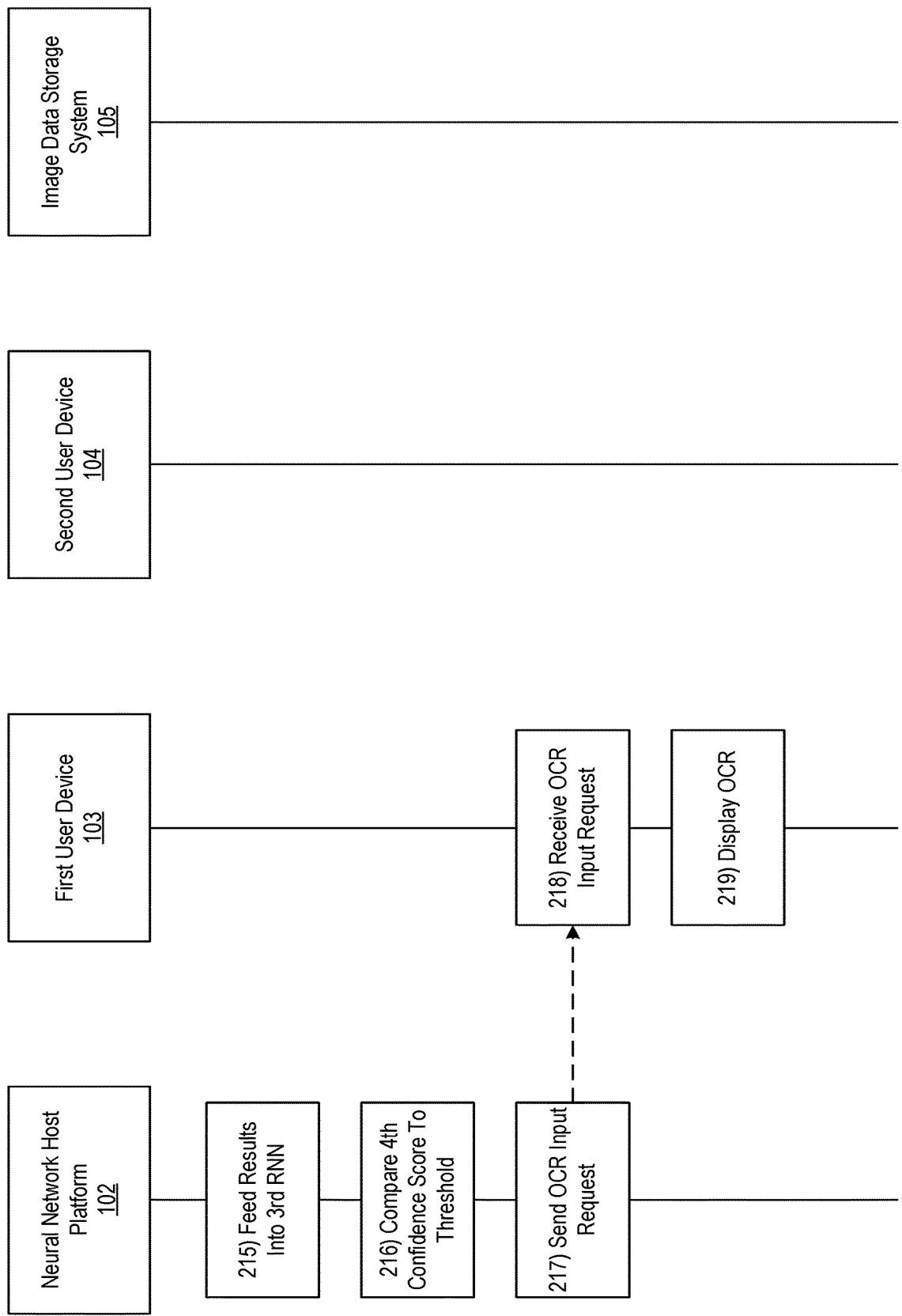

Referring to FIG. 2D, at step 215, the neural network host platform 102 may feed the results of the second RNN into a third RNN, which may be trained on a third context, different (and/or broader) than the first context and the second context. For example, the neural network host platform 102 may feed the results of the second RNN into a third RNN trained to identify a character based on a paragraph, section, chapter, document type, and/or other context. As a result, the neural network host platform 102 may output further updated contextual OCR information and a fourth confidence score, indicating a level of accuracy associated with the further updated contextual OCR information.

To continue with the example described above, the second RNN may have output that a particular character was either "e" or "c," but was only 50% confident that the character was either one. For example, both characters may have resulted in valid words (e.g., "eat" and "cat") that each made sense in the corresponding sentence. Accordingly, the neural network host platform 102 may use the third RNN to identify whether the character is "e" or "c," based on whether the sentence makes sense in the context of the corresponding paragraph, section, chapter, document type, or other context corresponding to the third RNN. In some instances, the third RNN may be able to identify the character with a confidence level that meets or exceeds the confidence threshold. For example, the third RNN may identify that the sentence is used in a paragraph that pertains to cats, and accordingly, the sentence likely uses the word "cat," and the third RNN may identify that the character is a "c" with a confidence score that meets or exceeds the confidence threshold. In contrast, if multiple results from the third RNN are valid (e.g., both sentences make sense in context of the paragraph), the third RNN may produce a confidence score that does not exceed the confidence threshold.

At step 216, the neural network host platform 102 may compare the fourth confidence score to the confidence threshold. If the neural network host platform 102 identifies that the fourth confidence score meets or exceeds the confidence threshold, the neural network host platform 102 may proceed to step 223. If the neural network host platform 102 identifies that the fourth confidence score does not exceed the confidence threshold, the neural network host platform 102 may proceed to step 217.

Although the three RNN layers are described, any larger number of RNN layers may be implemented without departing from the scope of the disclosure. For example, the neural network host platform 102 may feed the results of the third RNN into yet another RNN layer if the fourth confidence score does not exceed the confidence threshold.

At step 217, the neural network host platform 102 may send an OCR input request to the first user device 103. For example, the neural network host platform 102 may send the OCR input request to the first user device 103 via the communication interface 113 and while the second wireless data connection is established. In sending the OCR input request, the neural network host platform 102 may send a request for manual input indicating the identity of a particular character (e.g., that was unable to be automatically identified with a confidence level that meets or exceeds the confidence threshold). In some instances, the neural network host platform 102 may send, along with the OCR input request, one or more commands directing the first user device 103 to display the OCR input request.

At step 218, the first user device 103 may receive the OCR input request. For example, the first user device 103 may receive the OCR input request while the second wireless data connection is established. In some instances, the first user device 103 may also receive the one or more commands directing the first user device 103 to display the OCR input request.

At step 219, based on or in response to the one or more commands directing the first user device 103 to display the OCR input request, the first user device 103 may display the OCR input request. For example, the first user device 103 may display a graphical user interface similar to graphical user interface 405, which may indicate a particular character and may prompt for manual confirmation of the character.

Figure 2E:
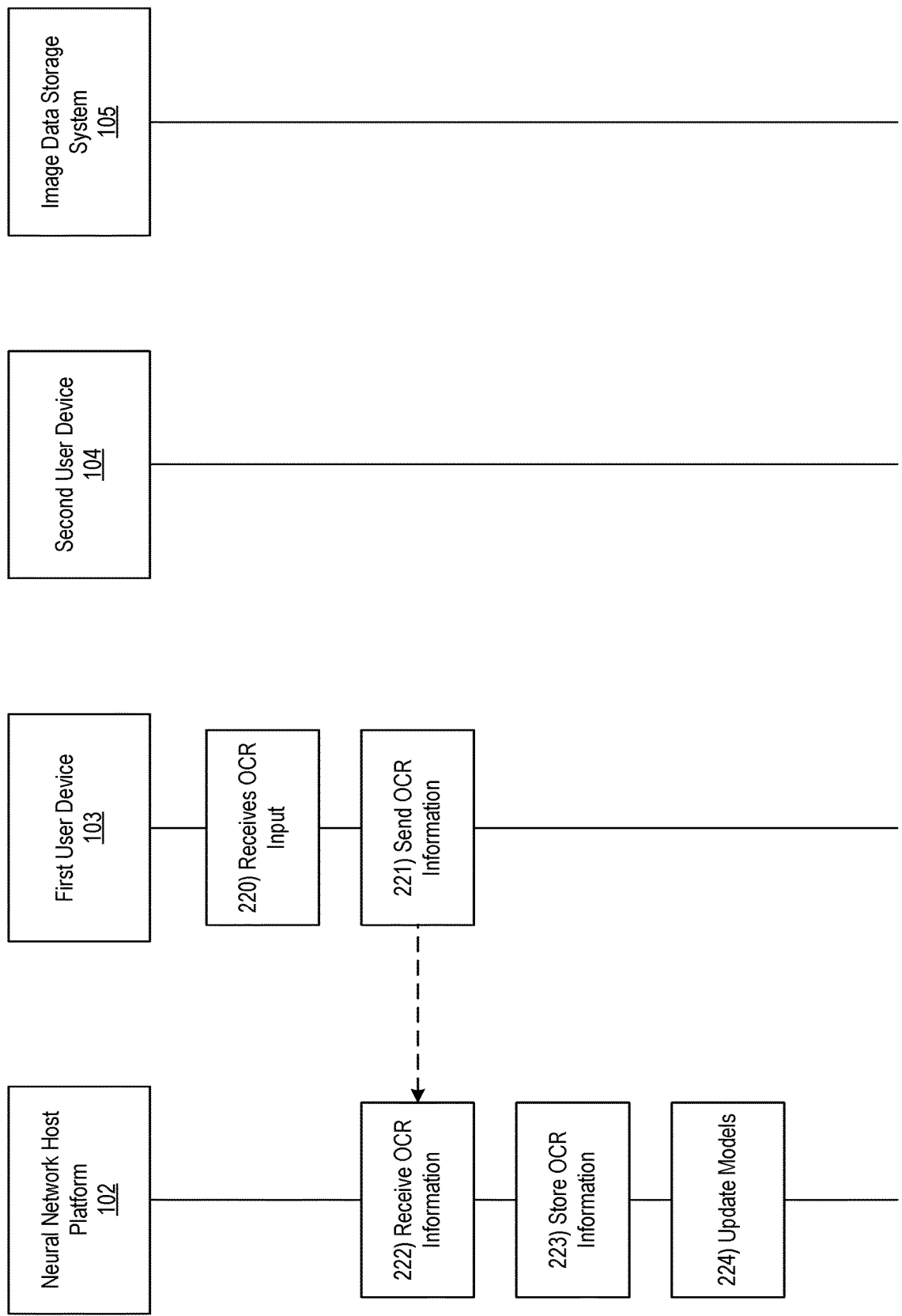

Referring to FIG. 2E, at step 220, the first user device 103 may receive an OCR input confirming the character. At step 221, the first user device 103 may send OCR information, based on the OCR input, to the neural network host platform 102. For example, the first user device 103 may send the OCR information to the neural network host platform 102 while the second wireless data connection is established.

At step 222, the neural network host platform 102 may receive the OCR information. For example, the neural network host platform 102 may receive the OCR information via the communication interface 113 and while the second wireless data connection is established.

At step 223, the neural network host platform 102 may store the OCR information (e.g., the OCR information produced by the CNN, any of the RNNs, and/or the manually input OCR information). For example, the neural network host platform 102 may store a digital version of the document included in the image received at step 208. In doing so, the neural network host platform 102 may store the digital version of the document for subsequent access.

At step 224, the neural network host platform 102 may update, reinforce, or otherwise modify the CNN and/or RNNs based on the OCR information. For example, the neural network host platform 102 may add an additional labelled data point (e.g., a label of the identified character on the image of the character) to the stored datasets, which may help to further refine and dynamically update the models going forward (which may e.g., increase accuracy of the models).

Figure 2F:
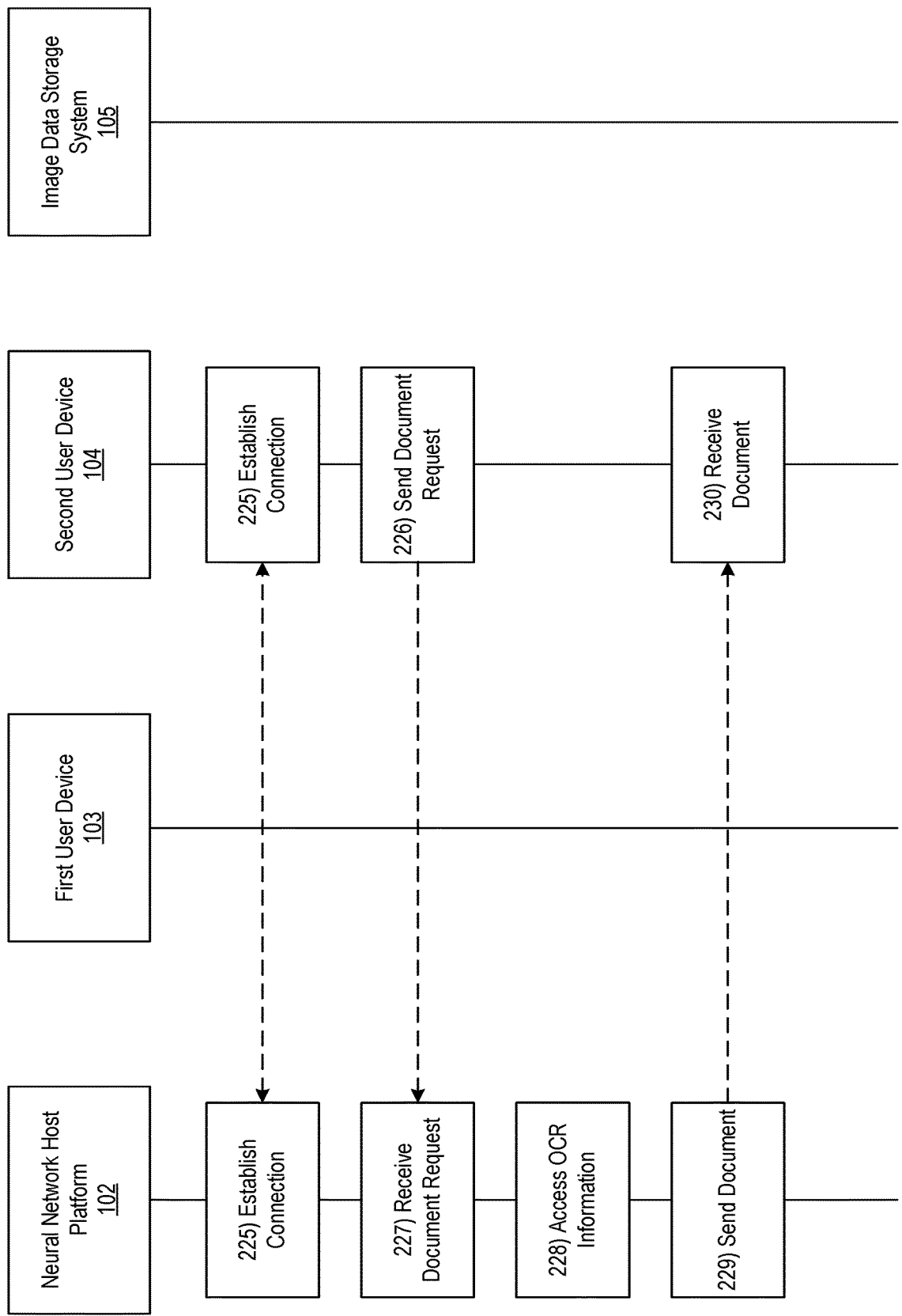

Referring to FIG. 2F, at step 225, the second user device 104 may establish a connection with the neural network host platform 102. For example, the second user device 104 may establish a third wireless data connection with the neural network host platform 102 to link the second user device 104 to the neural network host platform 102 (e.g., in preparation for requesting a digital document). In some instances, the second user device 104 may identify whether or not a connection is already established with the neural network host platform 102. If a connection is already established with the neural network host platform 102, the second user device 104 might not re-establish the connection. If a connection is not yet established with the neural network host platform 102, the second user device 104 may establish the third wireless data connection as described herein.

At step 226, the second user device 104 may send a request for the digital document generated based on the image. For example, the second user device 104 may send the request for the digital document while the third wireless data connection is established.

At step 227, the neural network host platform 102 may receive the request for the digital document. For example, the neural network host platform 102 may receive the request for the digital document via the communication interface 113 and while the third wireless data connection is established.

At step 228, the neural network host platform 102 may access the OCR information/digital document stored at step 223. At step 229, the neural network host platform 102 may send the OCR information/digital document to the second user device 104. For example, the neural network host platform 102 may send the OCR information/digital document to the second user device 104 via the communication interface 113 and while the third wireless data connection is established. In some instances, the neural network host platform 102 may also send one or more commands directing the second user device 104 to display the digital document.

At step 230, the second user device 104 may receive the OCR information/digital document sent at step 229. For example, the second user device 104 may receive the OCR information/digital document while the second wireless data connection is established. In some instances, the second user device 104 may also receive the one or more commands directing the second user device 104 to display the digital document.

Referring to FIG. 2G, at step 231, the second user device 104 may render and/or display the digital document. For example, the second user device 104 may display a graphical user interface similar to graphical user interface 505, which is shown in FIG. 5, and which depicts a digital version of the document captured in the image at step 205, generated using OCR.

As mentioned above, any number of RNN layers (e.g., more or fewer than those described herein) may be applied without departing from the scope of this disclosure. Additionally, although the digital document is described as generated based on an image from a first device, and ultimately accessed/displayed by another device, the document may be accessed by the first device without departing from the scope of this disclosure. Furthermore, although the above event sequence is primarily described with regard to identifying letters, the methods described herein may be used to identify/distinguish numbers (e.g., as related to zip codes, addresses, phone numbers, mathematical operations, pricing information, and/or other contexts), punctuation (e.g., commas, decimals, and/or other punctuation), and/or other characters without departing from the scope of the disclosure. For example, in the use case involving identification of a number, one of the RNNs may be trained to identify a character using mathematical operations (e.g., identifying a mathematical operation, and then solving for that mathematical operation to identify the target character).

Figure 3:
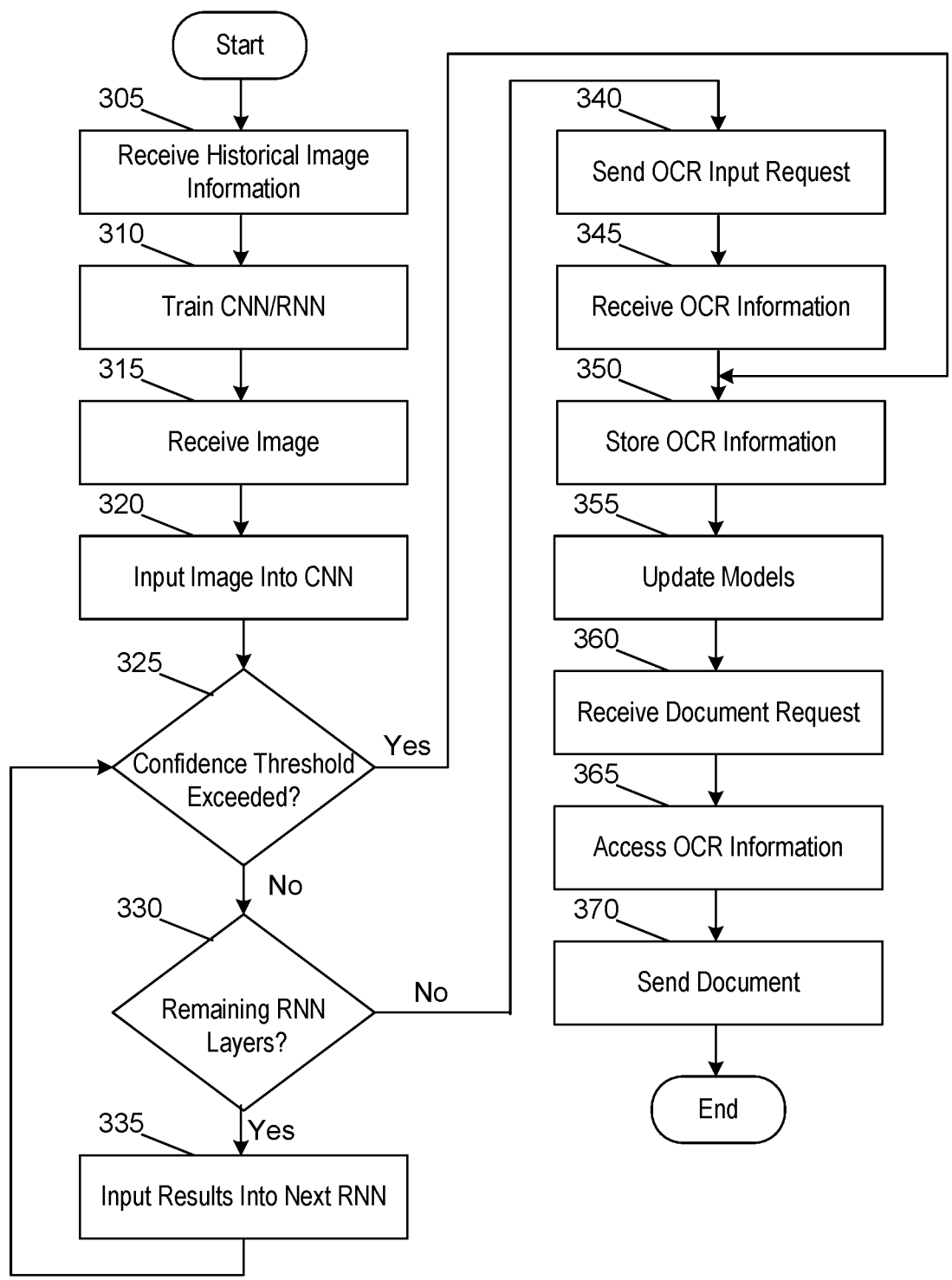
FIG. 3 depicts an illustrative method for implementing a multi-layer RNN and CNN for context sensitive OCR in accordance with one or more example embodiments.

FIG. 3 depicts an illustrative method for implementing a multi-layer RNN and CNN for context sensitive OCR in accordance with one or more example embodiments. Referring to FIG. 3, at step 305, a computing platform having at least one processor, a communication interface, and memory may receive historical images and/or historical image information. At step 310, the computing platform may train a CNN and one or more RNN layers using the historical images, historical image information, and/or other information. At step 315, the computing platform may receive an image of a document. At step 320, the computing platform may input the image into the CNN, resulting in OCR information and a confidence score. At step 325, the computing platform may identify whether or not the confidence score meets or exceeds a confidence threshold. If the confidence score exceeds the confidence threshold, the computing platform may proceed to step 350. If the confidence score does not exceed the confidence threshold, the computing platform may proceed to step 330.

At step 330, the computing platform may identify if an RNN layer is trained and has not yet been used to analyze the OCR information. If so, the computing platform may proceed to step 335. If not, the computing platform may proceed to step 340.

At step 335, the computing platform may input the OCR information into a RNN to produce contextual OCR information and a confidence score. The computing platform may then return to step 325 to compare the confidence score to the confidence threshold.

At step 340, the computing platform may send an OCR input request to a user device. At step 345, the computing platform may receive OCR input information. At step 350, the computing platform may store the OCR information to generate a digital version of the document. At step 355, the computing platform may update the CNN and/or RNNs based on the OCR information. At step 360, the computing platform may receive a request for the digital version of the document. At step 365, the computing platform may access the digital document/OCR information. At step 370, the computing platform may send the digital version of the document.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
      train, using historical images and historical image information, a convolutional neural network (CNN) and a first recursive neural network (RNN), wherein training the CNN and the first RNN configures:
         the CNN to perform optical character recognition (OCR), and
         the first RNN to identify one or more characters using a first context on which the first RNN is trained;
      receive an image of a document;
      input the image into the CNN, wherein inputting the image into the CNN causes the CNN to output OCR information for the image and a first confidence score indicating an accuracy level corresponding to the OCR information;
      compare the first confidence score to a confidence threshold;
      based on identifying that the first confidence score exceeds the confidence threshold, store the OCR information along with the image to enable subsequent access of a digital version of the document; and
      based on identifying that the first confidence score does not exceed the confidence threshold:
         input the OCR information into the first RNN, wherein inputting the image into the first RNN causes the first RNN to output contextual OCR information for the image, and
         store the contextual OCR information along with the image to enable subsequent access of the digital version of the document.

2. The computing platform of claim 1, wherein the first context on which the first RNN is trained comprises a word context, and wherein training the first RNN comprises training the first RNN to identify the one or more characters based on words in which the one or more characters are located.

3. The computing platform of claim 1, wherein the memory stores additional computer-readable instructions that, when executed by the at least one processor, cause the computing platform to:
   output, using the first RNN, a second confidence score indicating an accuracy level corresponding to the contextual OCR information;
   compare the second confidence score to the confidence threshold;
   based on identifying that the second confidence score exceeds the confidence threshold, store the contextual OCR information along with the image to enable subsequent access of a digital version of the document; and
   based on identifying that the second confidence score does not exceed the confidence threshold:
      input the contextual OCR information into a second RNN, wherein inputting the contextual OCR information into the second RNN causes the second RNN to update the contextual OCR information based on a second context, and
      store the updated contextual OCR information along with the image to enable subsequent access of a digital version of the document.

4. The computing platform of claim 3, wherein the memory stores additional computer-readable instructions that, when executed by the at least one processor, cause the computing platform to:
   train, using the historical images and the historical image information, the second RNN, wherein training the second RNN configures the second RNN to identify the one or more characters using the second context, wherein the second context is broader than the first context.

5. The computing platform of claim 4, wherein the second context on which the second RNN is trained comprises a sentence context, and wherein training the second RNN comprises training the second RNN to identify the one or more characters based on sentences in which the one or more characters are located.

6. The computing platform of claim 3, wherein the memory stores additional computer-readable instructions that, when executed by the at least one processor, cause the computing platform to:
output, using the second RNN, a third confidence score indicating an accuracy level corresponding to the updated contextual OCR information;
compare the third confidence score to the confidence threshold;
based on identifying that the third confidence score exceeds the confidence threshold, store the updated contextual OCR information along with the image to enable subsequent access of a digital version of the document; and
based on identifying that the third confidence score does not exceed the confidence threshold:
input the updated contextual OCR information into a third RNN, wherein inputting the updated contextual OCR information into the third RNN causes the third RNN to further update the updated contextual OCR information based on a third context, and
store the further updated contextual OCR information along with the image to enable subsequent access of a digital version of the document.

7. The computing platform of claim 6, wherein the memory stores additional computer-readable instructions that, when executed by the at least one processor, cause the computing platform to:
train, using the historical images and the historical image information, the third RNN, wherein training the third RNN configures the third RNN to identify the one or more characters using the third context, wherein the third context is broader than the second context.

8. The computing platform of claim 4, wherein the third context on which the third RNN is trained comprises a document type context, and wherein training the third RNN comprises training the third RNN to identify the one or more characters based on types of documents in which the one or more characters are located.

9. The computing platform of claim 6, wherein the memory stores additional computer-readable instructions that, when executed by the at least one processor, cause the computing platform to:
output, using the third RNN, a fourth confidence score indicating an accuracy level corresponding to the further updated contextual OCR information;
compare the fourth confidence score to the confidence threshold;
based on identifying that the fourth confidence score exceeds the confidence threshold, store the further updated contextual OCR information along with the image to enable subsequent access of a digital version of the document; and
based on identifying that the fourth confidence score does not exceed the confidence threshold:
send one or more commands directing a user device to provide a manual OCR input identifying the one or more characters, wherein sending the one or more commands directing the user device to provide the manual OCR input causes the user device to display a user interface prompting for manual input of the one or more characters,
receive the manual OCR input, and
store the manual OCR input along with the image to enable subsequent access of a digital version of the document.

10. The computing platform of claim 1, wherein the memory stores additional computer-readable instructions that, when executed by the at least one processor, cause the computing platform to:
receive a request to access the digital version of the document;
retrieve, from storage, the contextual OCR information and the image; and
send, to a user device, one or more commands directing the user device to display the digital version of the document based on the contextual OCR information and the image, wherein sending the one or more commands directing the user device to display the digital version of the document causes the user device to display the digital version of the document.

11. A method comprising
at a computing platform comprising at least one processor, a communication interface, and memory:
training, using historical images and historical image information, a convolutional neural network (CNN) and a first recursive neural network (RNN), wherein training the CNN and the first RNN configures:
the CNN to perform optical character recognition (OCR), and
the first RNN to identify one or more characters using a first context on which the first RNN is trained;
receiving an image of a document;
inputting the image into the CNN, wherein inputting the image into the CNN causes the CNN to output OCR information for the image and a first confidence score indicating an accuracy level corresponding to the OCR information;
comparing the first confidence score to a confidence threshold;
based on identifying that the first confidence score exceeds the confidence threshold, storing the OCR information along with the image to enable subsequent access of a digital version of the document; and
based on identifying that the first confidence score does not exceed the confidence threshold:
inputting the OCR information into the first RNN, wherein inputting the image into the first RNN causes the first RNN to output contextual OCR information for the image, and
storing the contextual OCR information along with the image to enable subsequent access of the digital version of the document.

12. The method of claim 11, wherein the first context on which the first RNN is trained comprises a word context, and wherein training the first RNN comprises training the first RNN to identify the one or more characters based on words in which the one or more characters are located.

13. The method of claim 11, further comprising:
outputting, using the first RNN, a second confidence score indicating an accuracy level corresponding to the contextual OCR information;
comparing the second confidence score to the confidence threshold;
based on identifying that the second confidence score exceeds the confidence threshold, storing the contextual OCR information along with the image to enable subsequent access of a digital version of the document; and based on identifying that the second confidence score does not exceed the confidence threshold:
  inputting the contextual OCR information into a second RNN, wherein inputting the contextual OCR information into the second RNN causes the second RNN to update the contextual OCR information based on a second context, and
  storing the updated contextual OCR information along with the image to enable subsequent access of a digital version of the document.

14. The method of claim 13, further comprising:
training, using the historical images and the historical image information, the second RNN, wherein training the second RNN configures the second RNN to identify the one or more characters using the second context, wherein the second context is broader than the first context.

15. The method of claim 14, wherein the second context on which the second RNN is trained comprises a sentence context, and wherein training the second RNN comprises training the second RNN to identify the one or more characters based on sentences in which the one or more characters are located.

16. The method of claim 13, further comprising:
outputting, using the second RNN, a third confidence score indicating an accuracy level corresponding to the updated contextual OCR information;
comparing the third confidence score to the confidence threshold;
based on identifying that the third confidence score exceeds the confidence threshold, storing the updated contextual OCR information along with the image to enable subsequent access of a digital version of the document; and
based on identifying that the third confidence score does not exceed the confidence threshold:
  inputting the updated contextual OCR information into a third RNN, wherein inputting the updated contextual OCR information into the third RNN causes the third RNN to further update the updated contextual OCR information based on a third context, and
  storing the further updated contextual OCR information along with the image to enable subsequent access of a digital version of the document.

17. The method of claim 16, further comprising:
training, using the historical images and the historical image information, the third RNN, wherein training the third RNN configures the third RNN to identify the one or more characters using the third context, wherein the third context is broader than the second context.

18. The method of claim 14, wherein the third context on which the third RNN is trained comprises a document type context, and wherein training the third RNN comprises training the third RNN to identify the one or more characters based on types of documents in which the one or more characters are located.

19. The method of claim 16, further comprising:
outputting, using the third RNN, a fourth confidence score indicating an accuracy level corresponding to the further updated contextual OCR information;
comparing the fourth confidence score to the confidence threshold;
based on identifying that the fourth confidence score exceeds the confidence threshold, storing the further updated contextual OCR information along with the image to enable subsequent access of a digital version of the document; and
based on identifying that the fourth confidence score does not exceed the confidence threshold:
  sending one or more commands directing a user device to provide a manual OCR input identifying the one or more characters, wherein sending the one or more commands directing the user device to provide the manual OCR input causes the user device to display a user interface prompting for manual input of the one or more characters,
  receiving the manual OCR input, and
  storing the manual OCR input along with the image to enable subsequent access of a digital version of the document.

20. One or more non-transitory computer-readable media storing instructions that, when executed by a computing platform comprising at least one processor, a communication interface, and memory, cause the computing platform to:
train, using historical images and historical image information, a convolutional neural network (CNN) and a first recursive neural network (RNN), wherein training the CNN and the first RNN configures:
  the CNN to perform optical character recognition (OCR), and
  the first RNN to identify one or more characters using a first context on which the first RNN is trained;
receive an image of a document;
input the image into the CNN, wherein inputting the image into the CNN causes the CNN to output OCR information for the image and a first confidence score indicating an accuracy level corresponding to the OCR information;
compare the first confidence score to a confidence threshold;
based on identifying that the first confidence score exceeds the confidence threshold, store the OCR information along with the image to enable subsequent access of a digital version of the document; and
based on identifying that the first confidence score does not exceed the confidence threshold:
  input the OCR information into the first RNN, wherein inputting the image into the first RNN causes the first RNN to output contextual OCR information for the image, and
  store the contextual OCR information along with the image to enable subsequent access of the digital version of the document.

* * * * *

UNITED STATES PATENT AND TRADEMARK OFFICE
CERTIFICATE OF CORRECTION

PATENT NO. : 11,763,585 B2
APPLICATION NO. : 17/375319
DATED : September 19, 2023
INVENTOR(S) : Maharaj Mukherjee et al.

Page 1 of 1

It is certified that error appears in the above-identified patent and that said Letters Patent is hereby corrected as shown below:

In the Claims

Column 16, Claim 11, Line 20:
Delete "comprising" and insert --comprising:-- therefor Signed and Sealed this
Fifth Day of November, 2024

Katherine Kelly Vidal
Director of the United States Patent and Trademark Office